United States Patent
Li et al.

(10) Patent No.: US 10,241,629 B2
(45) Date of Patent: Mar. 26, 2019

(54) FILTERING CIRCUIT AND TOUCH DISPLAY DEVICE

(71) Applicants: Shanghai Tianma Micro-Electronics Co., Ltd., Shanghai (CN); Tianma Micro-Electronics Co., Ltd., Shenzhen (CN)

(72) Inventors: Hong Li, Shanghai (CN); Cheng Cheng, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 567 days.

(21) Appl. No.: 14/848,310

(22) Filed: Sep. 8, 2015

(65) Prior Publication Data
US 2016/0328044 A1     Nov. 10, 2016

(30) Foreign Application Priority Data

May 8, 2015   (CN) .......................... 2015 1 0232943

(51) Int. Cl.
  *G06F 3/044*  (2006.01)
  *G06F 3/041*  (2006.01)
  *G09G 3/00*  (2006.01)

(52) U.S. Cl.
  CPC ............ *G06F 3/044* (2013.01); *G06F 3/0412* (2013.01); *G06F 3/0416* (2013.01); *G09G 3/00* (2013.01); *G09G 2300/0434* (2013.01)

(58) Field of Classification Search
  None
  See application file for complete search history.

(56) References Cited

U.S. PATENT DOCUMENTS

2011/0096023 A1*  4/2011  Shih ...................... G06F 3/0412
                                                                           345/174
2016/0246445 A1    8/2016  Tang et al.

FOREIGN PATENT DOCUMENTS

CN          101281330 B       5/2010
CN          102193033 A       9/2011
                (Continued)

OTHER PUBLICATIONS

Chinese Application No. 201510232943.1, First Office Action dated May 2, 2017.

*Primary Examiner* — Amare Mengistu
*Assistant Examiner* — Shawna T Stepp Jones
(74) *Attorney, Agent, or Firm* — Alston & Bird LLP

(57) ABSTRACT

It is provided a filtering circuit and a touch display device. The touch display device includes: a substrate; a common electrode arranged on the substrate; a signal source configured to provide a display signal or a touch signal; a filter capacitor including a first terminal and a second terminal, where a fixed electric potential is applied to the second terminal of the filter capacitor; and a control switch arranged between a common electrode lead and the first terminal of the filter capacitor to electrically connect/disconnect the filter capacitor with/from the common electrode lead. In a case that the signal source provides a display signal, the control switch is switched on to electrically connect the filter capacitor with the first node. In a case that the signal source provides a touch signal, the control switch is switched off to electrically disconnect the filter capacitor from the first node.

17 Claims, 7 Drawing Sheets

(56) References Cited

FOREIGN PATENT DOCUMENTS

| | | |
|---|---|---|
| CN | 104021769 A | 9/2014 |
| CN | 104135817 A | 11/2014 |

\* cited by examiner

FILTERING CIRCUIT AND TOUCH DISPLAY DEVICE

CROSS REFERENCE TO RELATED APPLICATIONS

The present application claims the priority to Chinese Patent Application No. 201510232943.1, entitled "FILTERING CIRCUIT AND TOUCH DISPLAY DEVICE", filed on May 8, 2015 with the State Intellectual Property Office of the PRC, which is incorporated herein by reference in its entirety.

FIELD OF THE INVENTION

The present disclosure relates to the technical field of display, and in particular to a filtering circuit and a touch display device.

BACKGROUND OF THE INVENTION

At present, as an input medium, a touch screen is an easy, convenient and natural device for human-computer interaction. It has become a research and development focus for more and more flat panel display manufactures to integrate a touch function into a Liquid Crystal Display (LCD) or an Organic Light-Emitting Diode (OLED) display.

In recent years, in the field of display, an in cell Touch display Panel (in cell TP) was developed to further reduce the volume of a touch screen, so as to reduce the size of a mobile terminal having the touch screen. For the in cell TP, touch electrodes are integrated into a liquid crystal display panel. Therefore, a touch screen in which the in cell touch display technique is adopted may have a smaller size than a touch screen in which a One Glass Solution (OGS) is adopted.

In the conventional in cell TP, a common electrode in a pixel region doubles as touch electrodes, and thus the volume of the in cell TP can be reduced. However, in a case that a picture is displayed on a liquid crystal display panel, the common electrode is prone to be affected by a feed-through voltage generated due to a change in a gate electrode drive signal, resulting in a big noise in an output waveform of the common electrode, and further resulting in display abnormities in some display pictures, such as a ripple effect in a grayscale picture, thereby affecting the experience of a client. In this case, the precision of touch sensing may be decreased in a touch sensing phase if an existing filtering method is used to reduce the noise.

Therefore, the issuses are how to reduce the noise in the output waveform of the common electrode, how to improve the quality of a display picture and how to improve the precision of touch sensing.

BRIEF SUMMARY OF THE INVENTION

In the present disclosure, a filtering circuit and a touch display device are provided to reduce a noise in an output waveform of a common electrode, improve the quality of a display picture and improve the precision of touch sensing.

In order to address the above issues, a filtering circuit is provided according to the present disclosure, which includes:
 a signal source configured to provide a display signal or a touch signal;
 a first node electrically connected to the signal source;
 a filter capacitor including a first terminal and a second terminal, where a fixed electric potential is applied to the second terminal of the filter capacitor; and
 a control switch arranged between the first node and the first terminal of the filter capacitor to electrically connect/disconnect the filter capacitor with/from the first node.

A touch display device is further provided according to the present disclosure, which may include: a substrate; pixel electrodes arranged on the substrate to load pixel voltages; at least one common electrode arranged on the substrate to load a common voltage in a display phase and to load a touch detection signal or a touch drive signal in a touch phase; a signal source arranged on the substrate to provide the common voltage, the touch detection signal or the touch drive signal; at least one common electrode lead electrically connected to the signal source and the common electrode to input the common voltage, the touch detection signal or the touch drive signal to the common electrode; at least one filter capacitor including a first terminal and a second terminal, where a fixed electric potential is applied to the second terminal of the filter capacitor; and at least one control switch arranged between the common electrode lead and the first terminal of the filter capacitor to electrically connect/disconnect the filter capacitor with/from the common electrode lead.

As compared with the conventional technologies, the technical solution according to the present disclosure has at least one of the following advantages. In a case that the signal source provides a display signal, the control switch may be switched on to electrically connect the filter capacitor with the first node. In this case, the filter capacitor can filter out a disturbance signal passing through the first node, thereby reducing a noise on the common electrode and improving the quality of a picture displayed by the touch display device. In a case that the signal source provides a touch signal, the control switch may be switched off to electrically disconnect the filter capacitor from the first node. In this case, the touch signal received by the common electrode is not easily distorted due to the filter capacitor, thereby improving the precision of touch sensing.

DETAILED DESCRIPTION OF THE INVENTION

As described in the background, in the conventional in cell TP, a common electrode in a pixel region doubles as touch electrodes, and thus the volume of the in cell TP can be reduced. However, in a case that a picture is displayed on a liquid crystal display panel, the common electrode is prone to be affected by a feed-through voltage generated due to a change in a gate electrode drive signal, resulting in a big noise in an output waveform of the common electrode, and further resulting in display abnormalities in a picture in a display phase, such as a ripple effect in a grayscale picture, thereby affecting the experience of a client. In this case, the precision of touch sensing may be decreased in a touch sensing phase if an existing filtering method is used to reduce the noise.

In order to address the above technical issue, a filtering circuit is provided according to the present disclosure, which includes:

a signal source configured to provide a display signal or a touch signal;

a first node electrically connected to the signal source;

a filter capacitor including a first terminal and a second terminal, where a fixed electric potential is applied to the second terminal of the filter capacitor; and a control switch arranged between the first node and the first terminal of the filter capacitor to electrically connect/disconnect the filter capacitor with/from the first node.

In a case that the signal source provides a display signal, the control switch may be switched on to electrically connect the filter capacitor with the first node. In this case, the filter capacitor can filter out a disturbance signal passing through the first node, thereby reducing a noise on the common electrode and improving the quality of a picture displayed by a touch display device. In a case that the signal source provides a touch signal, the control switch may be switched off to electrically disconnect the filter capacitor from the first node. In this case, the touch signal received by the common electrode is not easily distorted due to the filter capacitor, thereby improving the precision of touch sensing.

To make the above features and advantages of the disclosure more apparent and easier to be understood, specific embodiments of the disclosure will be illustrated in detail in conjunction with the drawings hereinafter.

Figure 1:
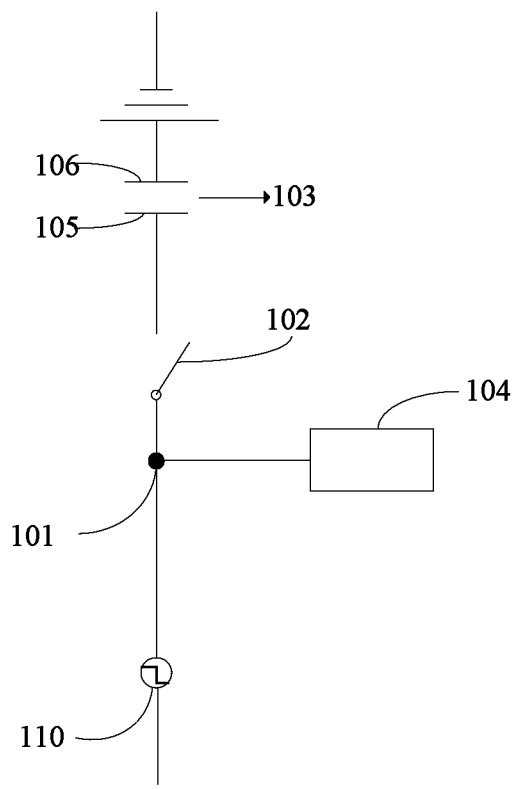
FIG. 1 is a schematic diagram of a filtering circuit according to the present disclosure.

FIG. 1 is a schematic diagram of a filtering circuit according to the present disclosure. Referring to FIG. 1, the filtering circuit in the embodiment includes a signal source 110, a first node 101, a filter capacitor 103 and a control switch 102.

The signal source 110 is configured to provide a display signal or a touch signal.

The first node 101 is electrically connected to the signal source 110.

The filter capacitor 103 includes a first terminal 105 and a second terminal 106, where a fixed electric potential is applied to the second terminal 106 of the filter capacitor 103.

The control switch 102 is arranged between the first node 101 and the first terminal 105 of the filter capacitor 103 to electrically connect/disconnect the filter capacitor 103 with/from the first node 101.

The first node 101 may be electrically connected to a load 104, and the filtering circuit can reduce a noise on the load 104. Specifically, in the embodiment, the filtering circuit is applied in a touch display device. The signal source 110 is a touch display chip in the touch display device. The touch display device includes a common electrode configured to load the display signal in a display phase of the touch display device and load or output the touch signal in a touch phase of the touch display device. The load 104 is the common electrode. The signal source 110 is electrically connected to the load 104 (the common electrode) via the first node 101 to input a display signal or the touch signal to the common electrode. It should be noted that, in the embodiment, the display signal input from the signal source 110 to the common electrode is a common voltage, which is not limited herein. The display signal provided by the signal source 110 may also be set as a scanning signal, a drive signal or the like.

Figure 2:
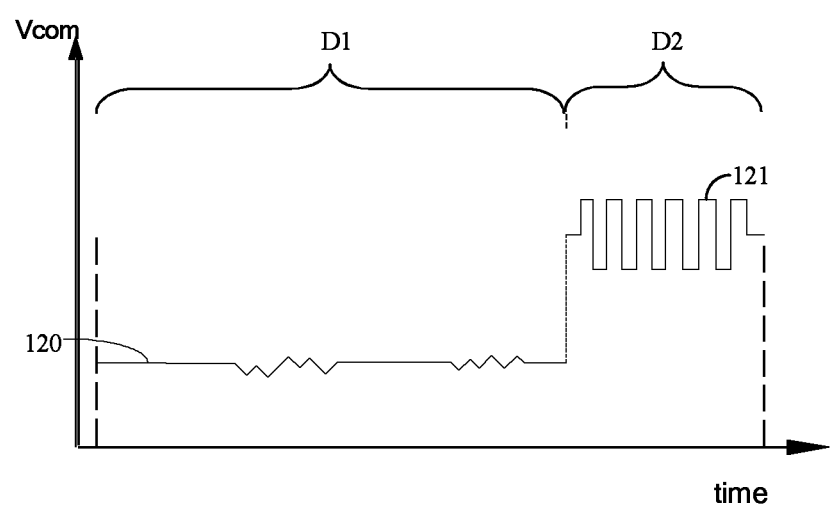
FIG. 2 is a schematic diagram of an output signal from a signal source in the filtering circuit shown in FIG. 1.

FIG. 2 is a schematic diagram of an output signal from the signal source 110 in the embodiment. In a display phase D1 of the touch display device, the signal source 110 outputs a display signal 120, which is a direct current signal with burrs. The burrs are generally generated due to a disturbance caused by a feed-through voltage, which may degrade the display quality of the touch display device. In a touch phase D2 of the touch display device, the signal source 110 outputs a touch signal 121, which is a high frequency alternating current signal.

In the embodiment, in the display phase D1 of the touch display device, in a case that the signal source 110 provides the display signal 120, the control switch 102 may be switched on to electrically connect the filter capacitor 103 with the first node 101. Since the filter capacitor 103 has a characteristic of allowing the high frequency to pass through while blocking the low frequency, a disturbance signal in the display signal 120 passing through the first node is filtered out by the filter capacitor 103. Thus, the waveform of the display signal 120 to be input to the common electrode is clearer, the noise on the common electrode is reduced, and the quality of a picture displayed by the touch display device is improved.

In the touch phase D2 of the touch display device, in a case that the signal source 110 provides the touch signal 121, the control switch 102 may be switched off to electrically disconnect the filter capacitor 103 from the first node 101. Thus, the touch signal received by the common electrode is not easily distorted due to the filter capacitor 103, thereby improving the precision of touch sensing.

It should be noted that, in the embodiment, the second terminal 106 of the filtering circuit 103 is electrically connected to the ground. The benefit in doing this is that, the filter capacitor 103 filters out the disturbance signal from the display signal 102 more efficiently. However, the second end 106 of the filtering circuit 103 is not limited to be electrically connected to the ground end. And in other embodiments, other fixed electric potentials may also be applied to the second terminal 106 of the filter capacitor 103.

Figure 3:
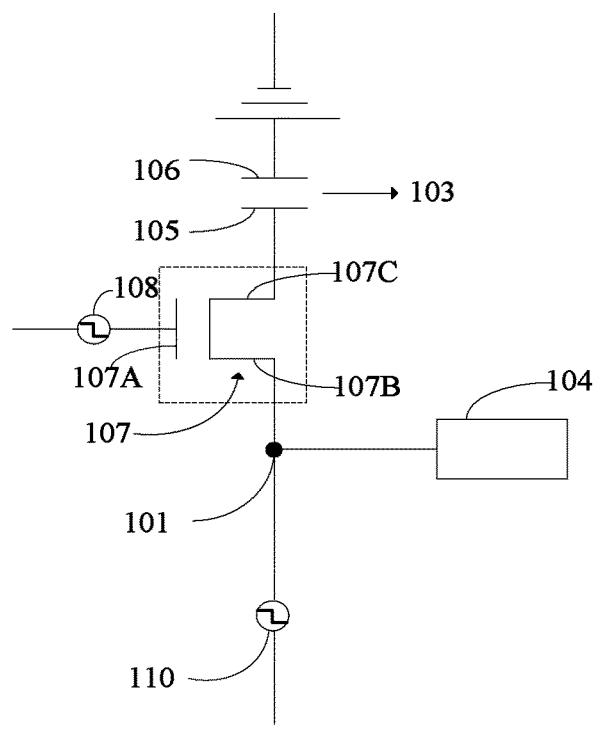
FIG. 3 is a schematic diagram of a control switch in the filtering circuit shown in FIG. 1.

FIG. 3 is a schematic diagram of the control switch in the filtering circuit shown in FIG. 1. Referring to FIG. 3, the control switch in the embodiment is a transistor 107 including a gate electrode 107A, a first electrode 107B and a second electrode 107C. The gate electrode 107A of the transistor 107 is input with a control signal 108. The first electrode 107B of the transistor 107 is electrically connected to the first node 101. The second electrode 107C of the transistor 107 is electrically connected to the first terminal 105 of the filtering circuit 103.

The control signal 108 has a first electrical level and a second electrical level. In a case that the signal source 110 provides the display signal, the control signal 108 is in the first electrical level to turn on the transistor 107, that is, to switch on the control switch. In a case that the signal source 110 provides the touch signal, the control signal 108 is in the second electrical level to turn off the transistor 107, that is, to switch off the control switch.

In the embodiment, the transistor is a thin film transistor. The first electrical level is a high electrical level, and the second electrical level is a low electrical level. However, the specific values of the first and second electrical levels are not limited herein. In other embodiments, the first electrical level may be a low electrical level and the second electrical level may be a high electrical level based on the type of the transistor.

It should be noted that, in the embodiment, the touch signal is a touch detection signal, in a case that the touch display device is a self-capacitive touch display device. And the touch signal is a touch drive signal, in a case that the touch display device is a mutual-capacitive touch display device.

Figure 4:
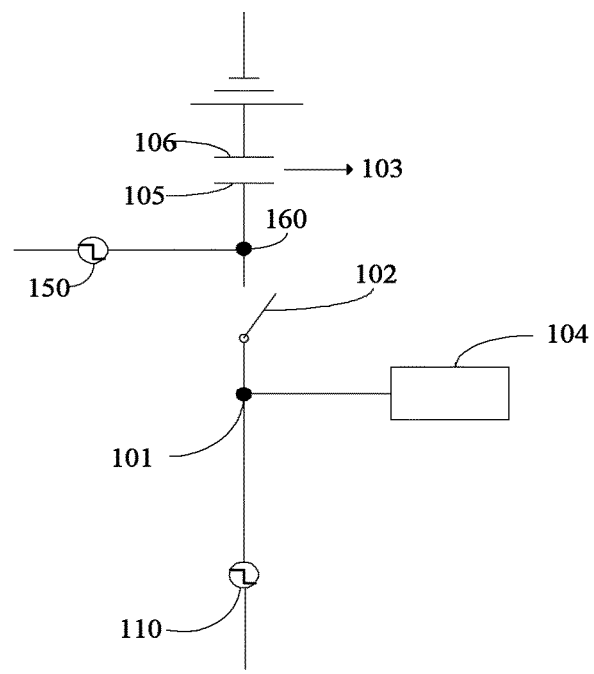
FIG. 4 is a schematic diagram of another filtering circuit according to the present disclosure.

FIG. 4 is a schematic diagram of another filtering circuit according to the present disclosure. An implementation of another filtering circuit according to the present disclosure is described by referring to FIG. 4. Similarly to the filtering circuit according to the above embodiment, the filtering circuit in the embodiment includes a signal source 110, a first node 101, a control switch 102 and a filter capacitor 103. The filter capacitor 103 includes a first terminal 105 and a second terminal 106. The filtering circuit is applied in a touch display device. The first node 101 is electrically connected to a load 104 which is a common electrode of the touch display device. The same parts of the filtering circuit according to the embodiment as those according to the above embodiment will not be described herein.

The filtering circuit according to the embodiment is different from the filtering circuit according to the above embodiment in that: the filtering circuit according to the embodiment further includes a second node 106 arranged between the first terminal 105 of the filter capacitor 103 and the control switch 102, where a sustaining voltage 150 is applied to the second node 160.

In a display phase of the touch display device, the signal source 110 provides a common voltage, to switch on the control switch 102 to load the common voltage to the first terminal 105 of the filter capacitor 103. In this case, the filter capacitor 103 can filter out a disturbance signal from the common voltage, thereby improving the common voltage to be loaded to the load 104.

If the sustaining voltage 150 is not applied to the second node 160, the control switch 102 is switched off in a touch phase of the touch display device to float the first terminal 105 of the filter capacitor 103. The display phase and the touch phase of the touch display device occur alternately. Due to a decreased electric potential on the floated first terminal 105 in the touch phase, the electric potential on the first terminal 105 may be less than the common voltage for a short time in a case that the control switch 102 is switched on in the display phase subsequent to this touch phase, thereby pulling down an electric potential on the first node 101 and further affecting the common voltage to be loaded to the load 104.

Therefore, in the embodiment, the sustaining voltage 150 is applied to the second node 160, and the value of the sustaining voltage 150 is the same as the value of the common voltage. In the touch phase, the sustaining voltage 150 is loaded to the first terminal 105 to charge the filter capacitor continuously. Then, in the display phase subsequent to this touch phase, the electric potential on the first terminal 105 of the filter capacitor 103 is equal to the common voltage provided by the signal source 110, thereby preventing the common voltage to be input to the load 104 from the first node 101 from being pulled down.

Figure 5:
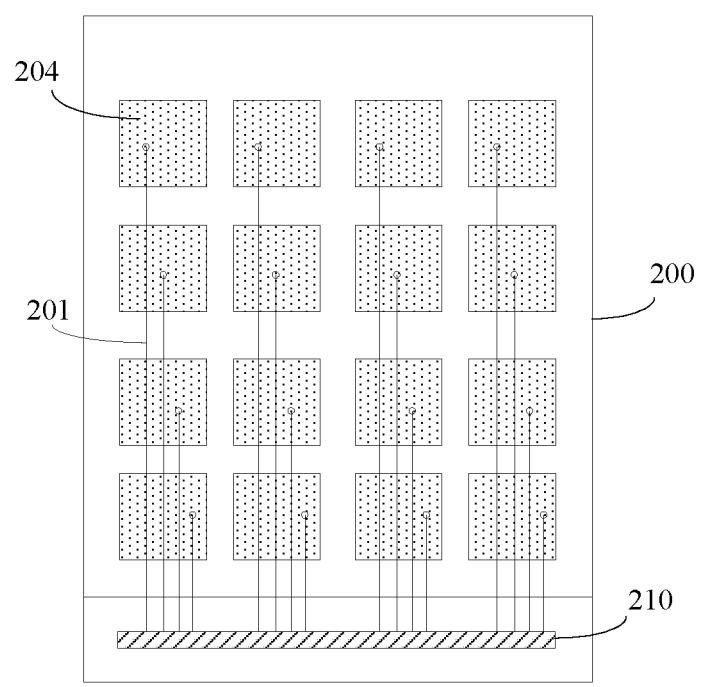
FIG. 5 is a schematic diagram of a touch display device according to the present disclosure.

Accordingly, a touch display device is further provided according to the present disclosure. FIG. 5 shows a schematic diagram of a touch display device according to the present disclosure. Referring to FIG. 5, the touch display device according to the embodiment includes a substrate 200, pixel electrodes (not shown), at least one common electrode 204, a signal source 210 and at least one common electrode lead 201.

The substrate 200 in the embodiment is a glass substrate, and the material of the substrate 200 is not limited herein.

The pixel electrodes are arranged on the substrate 200 and configured to load a pixel voltage.

The at least one common electrode 204 is arranged on the substrate 200 and configured to load a common voltage in a display phase and load a touch signal in a touch phase. That is to say, the common electrode 204 doubles as a touch electrode in the touch display device according to the embodiment.

The signal source 210 is arranged on the substrate 200 and configured to provide a display signal or a touch signal, with the display signal including the common voltage. In the embodiment, the signal source 210 is a touch display chip capable of providing the common voltage and the touch signal to the common electrode 204, which is not limited herein. In other embodiments, the signal source 210 may further include a touch chip and a display chip which are arranged separately. The touch chip is configured to provide the touch signal, and the display chip is configured to provide the display signal. It should be noted that, the display signal provided by the signal source 210 may also be set as a scanning signal, a drive signal or the like for controlling the pixel voltage on the pixel electrode, which is not limited herein.

The at least one common electrode lead 201 is electrically connected to the signal source 210 and the at least one common electrode 204 to input the common voltage and the touch signal to the common electrode 204.

It should be noted that, in the embodiment, the touch display device is a self-capacitive touch display device in which the common electrode 204 serves as the touch detection electrode separately. In the touch phase, the touch signal provided by the signal source 210 is set as a touch detection signal, which is not limited herein. In other embodiments, the touch display device may also be a mutual-capacitive touch display device, which further includes a touch sensing electrode. In this case, the common electrode serves as a touch drive electrode and is arranged opposite to the touch sensing electrode. Accordingly, the touch signal provided by the signal source 210 is set as a touch drive signal.

The touch display device according to the embodiment further includes at least one filter capacitor and at least one control switch, shapes of the filter capacitor and the control switch are not limited and are not shown in FIG. 5. In the following, the touch display device according to the embodiment is described in conjunction with FIG. 6, which is a schematic circuit diagram of the touch display device according to the embodiment.

Figure 6:
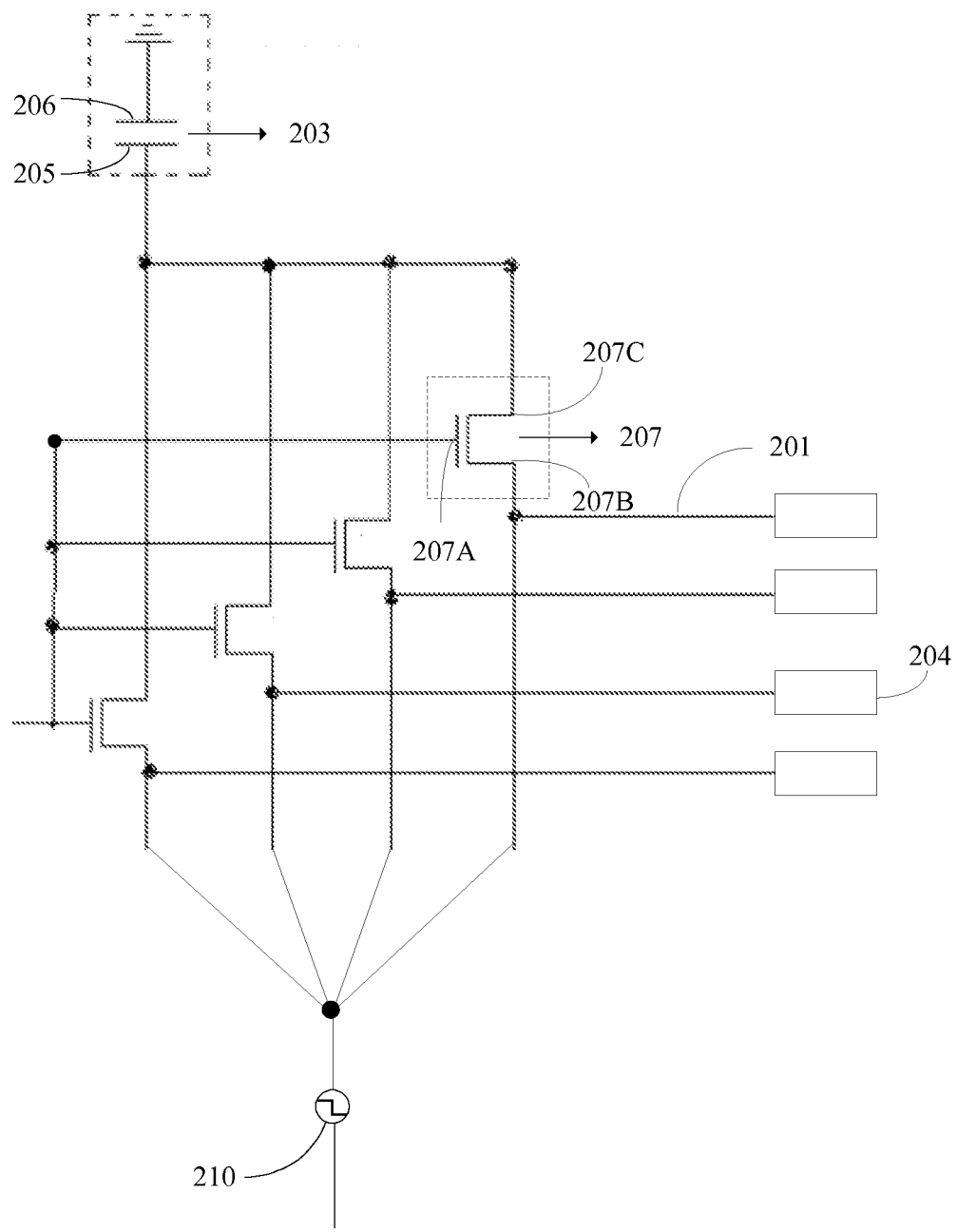
FIG. 6 is a schematic circuit diagram of the touch display device shown in FIG. 5.

Referring to FIG. 5 and FIG. 6, the filter capacitor 203 includes a first terminal 205 and a second terminal 206, where a fixed electric potential is applied to the second terminal 206 of the filter capacitor 203.

The control switch is arranged between the common electrode lead 201 and the first terminal 205 of the filter capacitor 203 to electrically connect/disconnect the filter capacitor 203 with/from the common electrode lead 201.

Specifically, the control switch in the embodiment is a transistor 207 including a gate electrode 207A, a first electrode 207B and a second electrode 207C. The gate electrode 207A of the transistor 207 is input with a control signal. The first electrode 207B of the transistor 207 is electrically connected to the common electrode lead 201. The second electrode 207C of the transistor 207 is electrically connected to the first terminal 205 of the filter capacitor 203.

Figure 7:
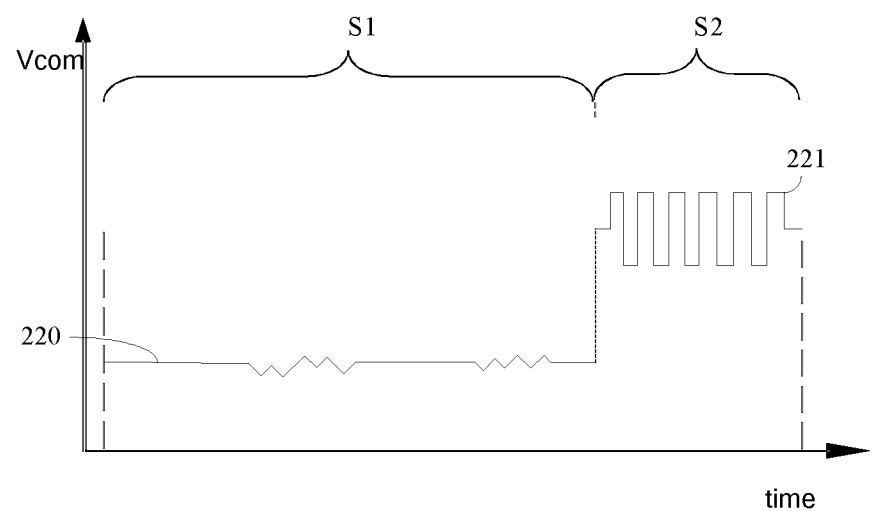
FIG. 7 is a schematic diagram of an signal output from a signal source to a common electrode in the touch display device shown in FIG. 5.

FIG. 7 shows a schematic diagram of a signal output from the signal source to the common electrode according to the embodiment. Referring to FIG. 6 and FIG. 7, in a display phase S1 of the touch display device, the signal source 210 outputs a display signal, which is a common voltage 220, to the common electrode. The common voltage 220 is a direct current signal with burrs. The burrs are generally generated due to a disturbance caused by a feed-through voltage, which may degrade the display quality of the touch display device. In a touch phase S2 of the touch display device, the signal source outputs a touch signal 221, which is a high frequency alternating current signal.

In the embodiment, in the display phase S1 of the touch display device, in a case that the signal source 210 provides the display signal, the control signal may be in a first electrical level to turn on the transistor 207, so as to electrically connect the first terminal 205 of the filter capacitor 203 with the signal source 210. Since the filter capacitor 203 has a characteristic of allowing the high frequency to pass through while blocking the low frequency, a disturbance signal in the common voltage 220 provided by the signal source 210 is filtered out by the filter capacitor 203. Thus, the waveform of the common voltage 220 to be input to the common electrode 204 is clearer, the noise on the common electrode 204 is reduced, and the quality of a picture displayed by the touch display device is improved.

In the touch phase S2 of the touch display device, in a case that the signal source 210 provides the touch signal, the control signal may be in a second electrical level to turn off the transistor 207, so as to electrically disconnect the first terminal 205 of the filter capacitor 203 from the signal source 210. Thus, the touch signal received by the common electrode 204 is not easily distorted due to the filter capacitor 203 and the precision of touch sending is improved.

Specifically, in the embodiment, the transistor 207 is a thin film transistor, the first electrical level is a high electrical level, and the second electrical level is a low electrical level. The values of the first and second electrical levels are not limited herein. In other embodiments, the first electrical level may be a low electrical level and the second electrical level may be a high electrical level based on the type of the transistor. The control signal in the embodiment is provided by the signal source 210, but the source of the control signal is not limited herein.

Referring to FIG. 6, it should be noted that, in the embodiment, the second terminal 206 of the filter capacitor 203 is electrically connected to the ground. The benefit in doing this is that, the filter capacitor 203 filters out the disturbance signal from the display signal 220 more efficiently. However, the second end 206 of the filter capacitor 203 is not limited to be electrically connected to the ground end. And in other embodiments, other fixed electric potentials may also be applied to the second terminal 206 of the filter capacitor 203.

It should also be noted that, in the embodiment, if the touch display device is a self-capacitive touch display device, the touch signal is a touch detection signal. In other embodiments, if the touch display device is a mutual-capacitive touch display device, the touch signal is a touch drive signal, which is also a high frequency alternating current signal. Therefore, if the touch display device is the mutual-capacitive touch display device, the touch display device improves the quality of the picture displayed by the touch display device while having a high precision of touch sensing.

In the embodiment, the transistor 207 is a thin film transistor, and the filter capacitor 203 and the transistor 207 are arranged on the substrate 200. Preferably, the filter capacitor 203 and the transistor 207 are arranged on the substrate 200 in a film layer deposition and photolithography way, which is not limited herein. In other embodiments, the filter capacitor 203 and the control switch (the transistor 207) may also be arranged in the touch display chip. Alternatively, the transistor 207 is a Complementary Metal Oxide Semiconductor (CMOS) transistor, and the filter capacitor 203 and the transistor 207 each are arranged in the touch display chip; or an integrated circuit in the touch display chip includes multiple function modules, and the filter capacitor 203 and the transistor 207 are integrated into a certain one of the function modules.

Referring to FIG. 6 again, in the embodiment, the number of the at least one common electrode 204 is two or more, the number of the at least one common electrode lead 201 is two or more, and the number of the at least one control switch (the transistor 207) is two or more. Each of the common electrode leads 201 is electrically connected to one of the common electrodes 204 and one of the control switches. And the control switches are electrically connected to the first terminal 205 of one of the at least one filter capacitor 203. That is to say, in the embodiment, common voltages 220 to be input to the common electrodes 204 are filtered by one filter capacitor 203. The benefit in doing this is that, the area that the filter capacitor 203 occupies on the substrate 200 is reduced, and it becomes easier to wire on the substrate 200. In other embodiments, the area that the filter capacitor 203 occupies on the touch display chip may also be reduced, in a case that the filter capacitor 203 and the transistor 207 are arranged in the touch display chip.

Figure 8:
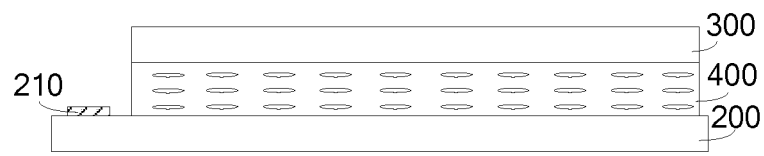
FIG. 8 is a sectional view of the touch display device shown in FIG. 5.

FIG. 8 shows a sectional view of a touch display device according to the embodiment. In the embodiment, the substrate 200 is an array substrate, and the touch display device further includes: a color filter 300 arranged opposite to the array substrate; and a liquid crystal layer 400 arranged between the array substrate and the color filter 300. In the embodiment, the signal source 210 (the touch display chip) is arranged on the substrate 200, which is not limited herein. In other embodiments, the signal source 210 may also be arranged on the color filter 300.

Figure 9:
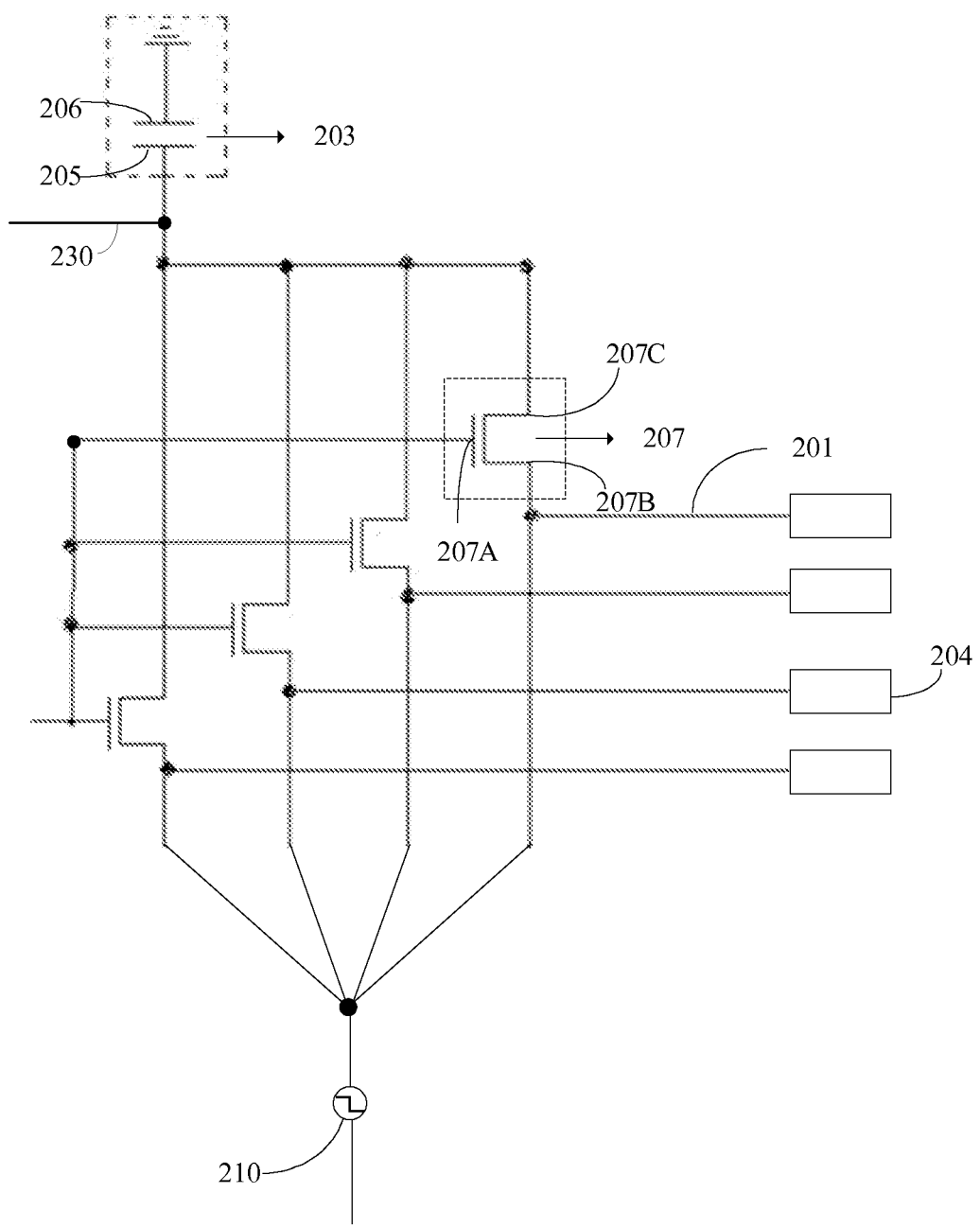
FIG. 9 is a schematic circuit diagram of another touch display device according to the present disclosure.

FIG. 9 shows a schematic circuit diagram of another touch display device according to the present disclosure. Similarly to touch display device in the embodiment shown in FIG. 6, the touch display device in the embodiment shown in FIG. 9 includes a signal source 210, at least one filter capacitor 203 and at least one common electrode 204, which are arranged on the substrate 200. The filter capacitor 203 includes the first terminal 205 and the second terminal 206. The number of the at least one common electrode 204 is two or more, the number of the at least one common electrode lead 201 is two or more, and the number of the at least one control switch (the transistors 207, each transistor 207 includes a gate electrode 207A, a first electrode 207B and a second electrode 207C) is two or more. Each of the common electrode leads 201 is electrically connected to one of the common electrodes 204. The same parts of the touch display device according to the embodiment as those according to the embodiment shown in FIG. 6 will not be described herein. And differences between the touch display device according to the embodiment and that according to the embodiment shown in FIG. 6 are as follows.

The touch display device further includes an electric potential sustaining lead 230 electrically connected to the first terminal 205 of the filter capacitor 203. The electric potential sustaining lead 230 is configured to apply a sustaining voltage to the filter capacitor 230.

In the display phase of the touch display device, the signal source 210 provides a common voltage to turn on the transistor 207, so as to load the common voltage to the first terminal 205 of the filter capacitor 203. In this case, the filter capacitor 203 can filter out a disturbance signal from the common voltage, thereby improving the common voltage to be loaded to the common electrode 204.

If the electric potential sustaining lead 230 is not arranged, the transistor 207 is turned off in the touch phase of the touch display device to float the first terminal 205 of the filter capacitor 203. The display phase and the touch phase of the touch display device occur alternately. Due to a decreased electric potential of the floated first terminal 205 in the touch phase, the electric potential on the first terminal 205 may be less than the common voltage for a short time in a case that the transistor 207 is turned on in the display phase subsequent to this touch phase, thereby pulling down the common voltage to be loaded to the common electrode 204.

Therefore, in the embodiment, the electric potential sustaining lead 230 is configured to apply a sustaining voltage to the filter capacitor 203, and the value of sustaining voltage is equal to the value of the common voltage. In the touch phase, the sustaining voltage is loaded to the first terminal 205 to charge the filter capacitor 203 continuously. Then, in the display phase subsequent to this touch phase, the electric potential on the first terminal 205 of the filter capacitor 203 is equal to the common voltage provided by the signal source 210, thereby preventing the common voltage to be input to the common electrode 204 from being pulled down.

Figure 10:
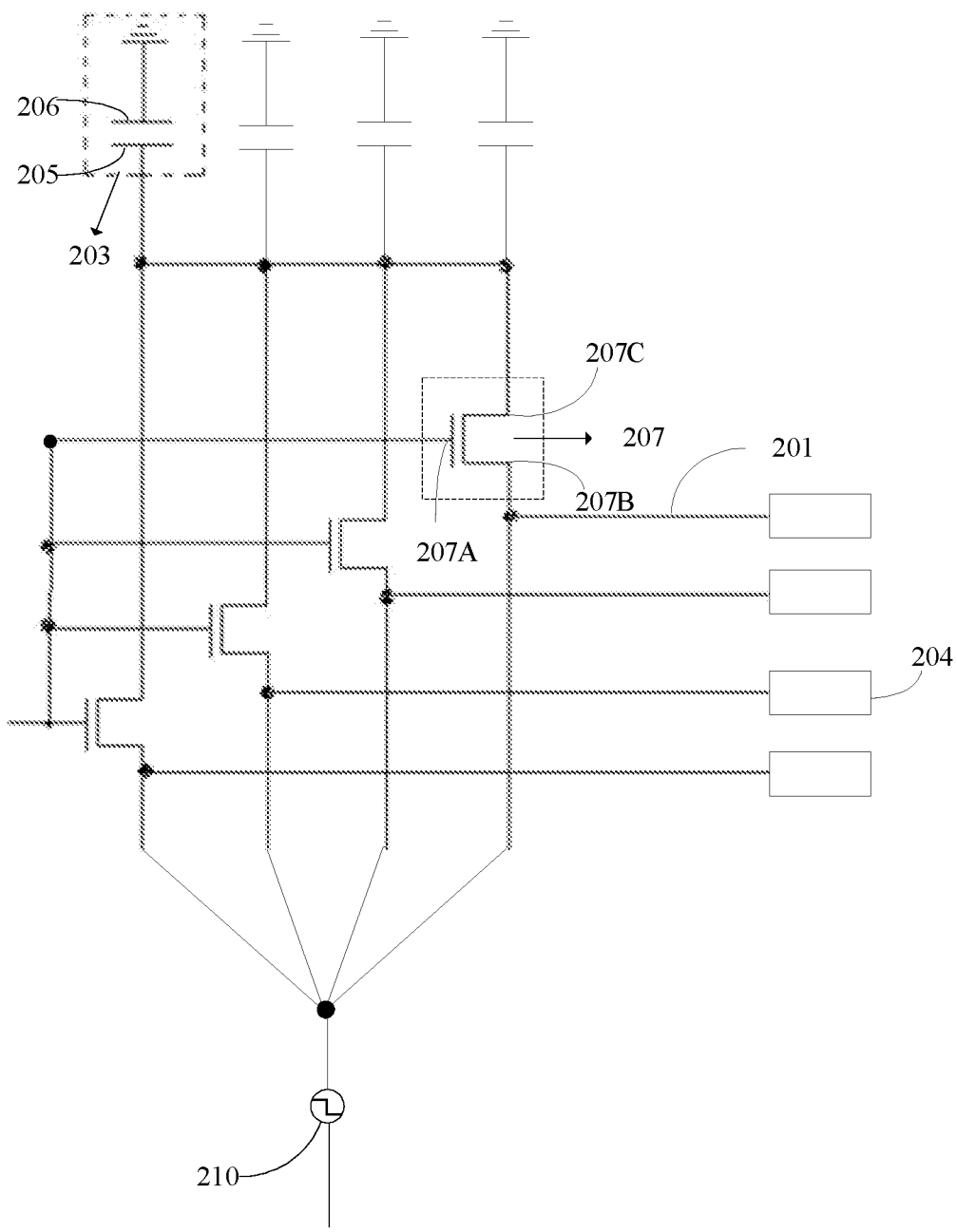
FIG. 10 is a schematic circuit diagram of another touch display device according to the present disclosure.

FIG. 10 shows a schematic circuit diagram of another touch display device according to the present disclosure. Similarly to touch display device in the embodiment shown in FIG. 6, the touch display device in the embodiment shown in FIG. 10 includes a signal source 210, at least one filter capacitor 203 and at least one common electrode 204, which are arranged on a substrate 200. The filter capacitor 203 includes the first terminal 205 and the second terminal 206. The number of the at least one common electrode 204 is two or more, the number of the at least one common electrode lead 201 is two or more, and the number of the at least one control switch (the transistors 207, each transistor 207 includes a gate electrode 207A, a first electrode 207B and a second electrode 207C) is two or more. Each of the common electrode leads 201 is electrically connected to one of the common electrodes 204. The same parts of the touch display device according to the embodiment as those according to the embodiment shown in FIG. 6 will not be described herein. And differences between the touch display device according to the embodiment and that according to the embodiment shown in FIG. 6 are as follows.

The number of the at least one filter capacitor 203 is two or more, and each of the control switches is electrically connected to the first terminal 205 of a corresponding one of the filter capacitors 203. The benefit in dong this is that, common voltages 220 to be input to the multiple common electrodes 204 are filtered via different filter capacitors 203, thereby further improving the waveform of the common voltage 220 and improving the quality of a display image.

The present disclosure is disclosed above, but the present disclosure is not limited thereto. Various alternations and modifications can be made to the technical solution of the present disclosure by those skilled in the art without deviation from the spirit and scope of the present disclosure. Therefore, the scope of protection of the present disclosure should be defined by the appended claims.

What is claimed is:

1. A filtering circuit in a touch display device, comprising:
a common electrode;
a signal source configured to provide a display signal or a touch signal; wherein the display signal comprises a common voltage; wherein the common voltage is a DC signal, and wherein the touch signal is an AC signal;
a first node electrically connected to the signal source directly, wherein the first node is electrically connected to the common electrode to input the display signal or the touch signal;
a filter capacitor including a first terminal and a second terminal, wherein a fixed electric voltage is applied to the second terminal; and
a control switch arranged between the first node and the first terminal of the filter capacitor to electrically connect the filter capacitor with the first node or electrically disconnect the filter capacitor from the first node;
wherein the control switch comprises a transistor, including a gate electrode, a first electrode and a second electrode, the gate electrode of the transistor receives a control signal as an input, the first electrode of the transistor is electrically connected to the first node, and the second electrode of the transistor is electrically connected to the first terminal of the filter capacitor;
wherein:
the transistor is switched on in the display phase, so that the first terminal of the filter capacitor connects electrically to the signal source; and
the transistor is switched off in the touch phase, so that the first terminal of the filter capacitor electrically disconnects from the signal source.

2. The filtering circuit according to claim 1, wherein the transistor is a thin film transistor.

3. The filtering circuit according to claim 1, wherein the control signal has a first electrical level and a second electrical level, the control signal is in the first electrical level to switch on the control switch in a case that the signal source provides the display signal, and the control signal is in the second electrical level to switch off the control switch in a case that the signal source provides the touch signal.

4. The filtering circuit according to claim 1, wherein the touch signal is a high frequency alternating voltage, and includes a touch detection signal and a touch drive signal.

5. The filtering circuit according to claim 1, wherein the second terminal of the filter capacitor is electrically connected to the ground.

6. The filtering circuit according to claim 1, further including a second node, wherein the second node is arranged between the first terminal of the filter capacitor and the control switch, and a sustaining voltage is applied to the second node.

7. A touch display device, comprising:
a substrate;
pixel electrodes arranged on the substrate;
at least one common electrode arranged on the substrate to load a common voltage in a display phase and to load a touch signal in a touch phase;

a signal source configured to provide a display signal or the touch signal, wherein the display signal includes the common voltage; wherein the common voltage is a direct current signal, and the touch signal is an alternating current signal;

at least one common electrode lead electrically connected to the signal source directly and the common electrode to input either the common voltage or the touch signal to the common electrode;

at least one filter capacitor comprising a first terminal and a second terminal, wherein a fixed electric voltage is applied to the second terminal of the filter capacitor; and at least one control switch arranged between the common electrode lead and the first terminal of the filter capacitor to electrically connect the filter capacitor with the common electrode lead or electrically disconnect the filter capacitor from the common electrode lead;

wherein the control switch comprises a transistor, including a gate electrode, a first electrode and a second electrode, the gate electrode of the transistor receives a control signal as an input, wherein the first electrode of the transistor is electrically connected to the common electrode lead, and the second electrode of the transistor is electrically connected to the first terminal of the filter capacitor;

wherein:

the transistor is switched on in the display phase, so that the first terminal of the filter capacitor connects electrically to the signal source; and the transistor is switched off in the touch phase, so that the first terminal of the filter capacitor electrically disconnects from the signal source.

8. The touch display device according to claim 7, wherein the transistor is a thin film transistor, and the filter capacitor and the control switch are arranged on the substrate.

9. The touch display device according to claim 7, wherein the signal source is a touch display chip.

10. The touch display device according to claim 9, wherein the filter capacitor and the control switch are arranged in the touch display chip.

11. The touch display device according to claim 7, wherein the touch display device is a self-capacitive touch display device, in which the common electrode separately serves as a touch detection electrode and the touch signal provided by the signal source is set as a touch detection signal.

12. The touch display device according to claim 7, wherein the touch display device is a mutual-capacitive touch display device, in which a touch sensing electrode is further included, the common electrode serves as a touch drive electrode and is arranged opposite to the touch sensing electrode, and the touch signal provided by the signal source is set as a touch drive signal.

13. The touch display device according to claim 7, wherein the number of the at least one common electrode is two or more, the number of the at least one common electrode lead is two or more, and the number of the at least one control switch is two or more; each of the common electrode leads is electrically connected to one of the common electrodes and one of the control switches, and the control switches are electrically connected to the first terminal of one of the at least one filter capacitor.

14. The touch display device according to claim 7, wherein the number of the at least one common electrode is two or more, the number of the at least one common electrode lead is two or more, the number of the at least one control switch is two or more, and the number of the at least one filter capacitor is two or more; each of the common electrode leads is electrically connected to one of the common electrodes and one of the control switches, and each of the control switches is electrically connected to the first terminal of a corresponding one of the filter capacitors.

15. The touch display device according to claim 7, wherein the substrate is an array substrate, the touch display device further includes a color filter arranged opposite to the array substrate and a liquid crystal layer arranged between the array substrate and the color filter.

16. The touch display device according to claim 7, wherein the second terminal of the filter capacitor is electrically connected to the ground.

17. The touch display device according to claim 7, further including an electric potential sustaining lead, wherein the electric potential sustaining lead is electrically connected to the first terminal of the filter capacitor to apply a sustaining voltage to the filter capacitor.

* * * * *